Patented July 7, 1942

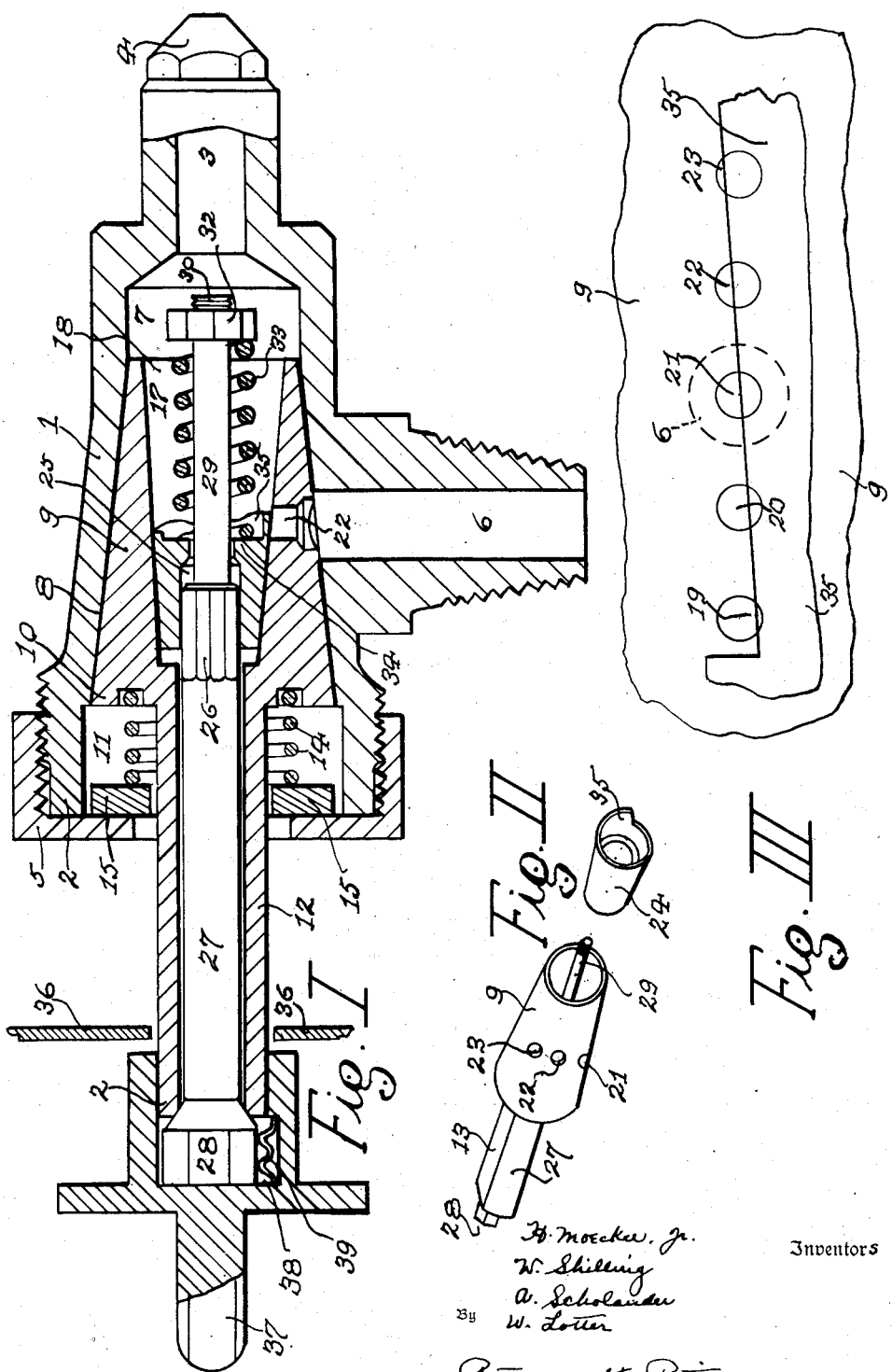

2,288,913

UNITED STATES PATENT OFFICE

2,288,913

GAS COCK

Henry Moecker, Jr., William E. Schilling, Axel Scholander, and William Lotter, Cleveland, Ohio, assignors to American Stove Company, St. Louis, Mo., a corporation of New Jersey Application October 16, 1941, Serial No. 415,316

18 Claims. (Cl. 277—41)

This invention relates to an improved gas cock conceived primarily for use in connection with a gas cooking range but the cock could be used in connection with other devices advantageously without departing from the spirit of the invention.

The primary object of the invention is to provide a cock which affords a plurality of fuel controls intermediate the on and off positions of the cock.

Another and further object of the invention is to provide a gas cock having the aforementioned attributes and in which the amount of fuel flow through the valve at any setting can be conveniently and quickly altered by selective adjustment.

A still further object of the invention is to provide a gas cock having the previously enumerated advantages and the further advantage of being less prone to foul than the ordinary cock by reason of the fact that full gas or fuel pressure is at all times against the admission side of the gas or fuel passageways through the valve.

A further object of the invention is the provision of a cock or valve which is cheap and simple of manufacture and assembly yet highly efficient and durable in operation.

Other objects, novel features of construction and improved results of the invention will appear from the following description and accompanying drawing.

In the drawing:

Fig. 1 is a vertical sectional view through the top.

Fig. 2 is a strung-out perspective view of the gas cock plug and adjusting cam.

Fig. 3 is a schematic illustration of how the cam adjusts the size of the passageways through the cock plug.

Referring to the drawing, 1 designates a hollow housing being open at its end 2 and provided at its opposite end with a reduced passageway 3 terminating in a conventional fuel outlet jet or nozzle 4. The open end of the housing is provided with a cap 5 threadedly attached to the housing and intermediate its length at one side the housing is provided with an exteriorly threaded fuel inlet conduit or passageway 6.

The hollow housing provides an interior chamber 7 having therein a tapered cylindrical seat 8 in which is rotatably mounted a tapered cylindrical elongated plug valve 9 the outer enlarged end 10 of which is adjacent but in separated relationship to the outer end 2 of the housing to provide a supplemental chamber 11 through which passes the plug stem 12 which is hollow and has opposed flattened exterior sides 13.

A coil spring 14 is positioned intermediate the large end 10 of the plug and a washer or packing 15 which abuts the inner side of the cap 5 holds the tapered valve plug sufficiently tight on its tapered seat to prevent fuel leakage.

The hollow plug stem 12 has its outer end 16 terminating well beyond the housing cap 5 and its inner end is in communication with a cylindrical tapered chamber 17 within the plug which chamber has its large end 18 in free communication with the housing chamber 7.

In spaced aligned relationship the valve plug 9 is provided with a plurality of transversely extending fuel inlet passageways 19, 20, 21, 22 and 23 which upon rotation of the plug are brought progressively into communication with the housing inlet conduit 6.

A tapered cylindrical plug-like member 24 which we term a cam plug is disposed within the main plug chamber 17 and has a gas-tight fit with the tapered seat thereof. This cam plug interiorly is provided with a socket 25 which is of octagonal shape in cross sectional configuration to receive the octagonal shaped portion 26 of an operating stem or shaft 27 which extends through the hollow plug stem 12 and beyond the outer end thereof and terminates in a nut 28. The cam plug stem 27 extends inwardly beyond its octagonal portion 26 in a reduced stem portion 29 and terminates in the housing chamber 7 in a threaded end 30 which carries a nut 32. A coil spring 33 is disposed between the nut 32 and the inner enlarged end 34 of the cam plug and holds the plug tightly on its seat and under sufficient tension to cause the cam plug to rotate with the main valve plug 9 as that plug is rotated.

The enlarged end 34 of the cam plug is provided with a cam-like extension 35 which by reference to Figs. 1 and 3 of the drawing it will be seen extends in varying degree over the main plug fuel inlets 19 to 23 inclusive.

The housing conduit is connected to some suitable source of fuel supply. When mounted in a range the valve plug stem 12 will extend outwardly beyond the front plate or panel 36 of a range and will carry an operating handle or knob 37 having at its inner side a chamber 38 for the reception of the operating nut 28 of the cam plug 24. This operating handle is freely removable from the valve plug stem and is retained in position under tension of the spring 39.

It will be obvious that a series of fuel control are provided intermediate the on and off positions of the cock. The full on position of the cock is attained when the plug passageway 19 is in communication with the housing inlet conduit 6. A reduced fuel supply is attained whenever the plug passageways 20 or 21 are in communication with the inlet 6 and a still further fuel reduction of fuel passage through the gas cock is attained when either of the plug openings 22 or 23 are in registry with the fuel inlet 6. Obviously the cam plug 24 can be conveniently rotated by removal of the operating handle 37 and by reason of these parts being exterior of the range the size of the passageways through the plug valve can be quickly and readily altered as is desired or necessary.

It is of course not practical to try to obtain close fuel control where a valve has only a single passageway. Some form of metering arrangement can be provided to obtain close control. In many gas cocks this is in the form of a needle valve but in such constructions fouling of the needle valve and its seat rapidly occurs as is well understood by those skilled in this art. The present construction avoids fouling and assures good passage of fuel through the passageways because a full pressure of gas is always present in the inlet conduit 6 and operating against whatever passageway of the plug is in registry therewith.

In all valves of the rotary plug type it is necessary to lubricate the same and this is commonly done by grease. If graduated control of the fuel supply is attempted by the use of small gas passageways the grease tends to clog them and bring about an unsatisfactory operation. The present arrangement makes it possible to provide large sized gas passageways yet obtain a close control of fuel. Additionally, during operation the grease will be wiped to and collect at the top of the gas passageways or holes 19 to 23 and as the metering is done by the cam at the bottoms of these holes the grease will have no tendency to clog that portion or area of these holes which is utilized as fuel passageways. Obviously the construction is one which constitutes an improvement insofar as the clogging of gas passageways by grease is concerned.

Changes can be made in the construction without departing from the spirit of the invention, and the invention is accordingly to be limited only within the scope of the hereinafter appended claims.

We claim:

1. In a gas cock, a housing provided with an inlet and an outlet in separated relationship, a movable member positioned intermediate said inlet and outlet for closing the same and provided with a plurality of passageways arranged in separated relationship, means by which said member may be moved to bring any one of said openings selectively into communication with said inlet, a second member normally movable with said first member and extending over the passageways thereof in different degrees to reduce the size of said passageways, and said second member being movable independently of the first member to vary the degree said second member extends over the passageways of the first member.

2. A construction such as defined in claim 1 wherein means is provided external of said housing for independently moving said second member.

3. A construction such as defined in claim 1 wherein the passageways through said first member are of equal size.

4. In a gas cock, a housing having inlet and outlet passageways in separated relationship, a valve in said housing for closing the inlet passageway thereof and provided with a plurality of passageways adapted to be selectively brought into communication with said housing inlet passageway, said valve being hollow and provided with a hollow stem extending exterior of the housing by which said valve may be rotated, a second valve within said first valve and rotatable therewith, said second valve having a cam-like portion extending over the passageways of the first valve to reduce in varying degrees the sizes of said openings, a second stem rotatable in said first stem and having operative engagement with said second valve for rotating said valve independent of the first valve, and said second stem exteriorly of said housing having means by which said stem and said second valve may be rotated to alter the degree said second valve closes the passageways of said first valve.

5. A construction such as defined in claim 4 wherein, said first valve is in the form of a tapered plug and said housing is provided with a tapered seat therefor, and said second valve is in the form of a tapered plug and said first valve is provided with a bore having a tapered seat therefor.

6. A construction such as defined in claim 4 wherein, said first valve and said second valve are concentrically arranged with the second valve within the first valve.

7. A construction such as defined in claim 4 wherein, said valves are concentrically arranged and each is in the form of a tapered plug, said housing is provided with a tapered seat for the first valve, and said first valve is provided with a bore having a tapered seat for the second valve.

8. A construction such as defined in claim 4 wherein, both of said valves are in the form of tapered plugs, said housing is provided with a tapered seat for the first valve, said first valve is provided with a tapered bore constituting a seat for the second valve, resilient means holds the first valve on its seat, and resilient means holds said second valve on its seat for normal rotation with said first valve.

9. A construction such as defined in claim 1 wherein, said second member is disposed within said first member and is provided with means exterior of the housing by which it may be moved independently of the first member.

10. A construction such as defined in claim 1 wherein, said first and second members are in the form of concentrically arranged rotary plugs with said second member within said first member, and means is provided external of the housing by which said second member can be rotated independent of the first member.

11. In a gas cock, a housing provided with an inlet and an outlet in separated relationship, a movable member positioned intermediate said inlet and outlet for closing the same and provided with a plurality of passageways arranged in separated relationship, means by which said member may be moved to selectively cause one of said openings to provide communication between said housing inlet and outlet openings, a second member normally movable with said first member and extending across the passageways thereof in different degrees to reduce the size of said passageways, and said second member being movable independently of the first member to vary the degree said second member extends across the passageways of the first member.

12. A construction such as defined in claim 11 wherein, means is provided external of said housing for independently moving said second member.

13. A construction such as defined in claim 11 wherein, said first and second members are in the form of tapered plugs and are telescopically arranged.

14. A construction such as defined in claim 11 wherein, said first and second members are in the form of tapered plugs and are telescopically arranged, and means is provided external of the housing for independently moving said second member.

15. A construction such as defined in claim 1 wherein, said first and second members are in the form of tapered plugs and are telescopically arranged.

16. A construction such as defined in claim 1 wherein, said first and second members are in the form of tapered plugs and are telescopically arranged, and means is provided external of the housing for independently moving said second member.

17. In a gas cock, a housing having inlet and outlet passageways in separated relationship, a valve in said housing for closing the inlet passageway thereof and provided with a plurality of passageways adapted to be moved to selectively cause one of said openings to provide communication between said housing inlet and outlet openings, said valve being hollow and provided with a hollow stem extending exterior of the housing by which said valve may be rotated, a second valve within said first valve and rotatable therewith, said second valve having a cam-like portion extending over the passageways of the first valve to reduce in varying degrees the sizes of said openings, a second stem rotatable in said first stem and having operative engagement with said second valve for rotating said valve independent of the first valve, and said second stem exteriorly of said housing having means by which said stem and said second valve may be rotated to alter the degree said second valve closes the passageways of said first valve, a handle on said first stem to facilitate the rotation of the stem, said second stem terminating within said handle, and said handle having quick detachable connection with said first stem to permit access to said second stem for rotation of the second valve.

18. A construction such as defined in claim 11 wherein, a handle external of the housing is provided for moving said first movable member, means is provided within said handle by which said second member may be moved independently of the first member, and said handle has quick detachable connection with said first movable member to permit access to the said means provided for moving said second movable member.

HENRY MOECKER, JR.
WILLIAM E. SCHILLING.
AXEL SCHOLANDER.
WILLIAM LOTTER.